United States Patent
Ireland

(10) Patent No.: US 10,718,313 B2
(45) Date of Patent: Jul. 21, 2020

(54) WIND TURBINE BLADE WITH POCKET-SHAPED DRAG PORTION, REVERSED-ORIENTATION AIRFOIL TRAILING SAME, AND AUXILIARY BLADE SUPPORTS

(71) Applicant: Kelso Energy Ltd, Winker (CA)

(72) Inventor: Barry Ross Ireland, Winkler (CA)

(73) Assignee: Kelso Energy Ltd., Winkler (CA)

( * ) Notice: Subject to any disclaimer, the term of this patent is extended or adjusted under 35 U.S.C. 154(b) by 218 days.

(21) Appl. No.: 15/756,637

(22) PCT Filed: Sep. 1, 2016

(86) PCT No.: PCT/CA2016/051036
§ 371 (c)(1),
(2) Date: Mar. 1, 2018

(87) PCT Pub. No.: WO2017/035655
PCT Pub. Date: Mar. 9, 2017

(65) Prior Publication Data
US 2018/0258911 A1   Sep. 13, 2018

Related U.S. Application Data

(60) Provisional application No. 62/213,184, filed on Sep. 2, 2015.

(51) Int. Cl.
*F03D 3/06* (2006.01)
*F03D 1/06* (2006.01)
*F03D 3/00* (2006.01)

(52) U.S. Cl.
CPC .......... *F03D 3/068* (2013.01); *F03D 1/0641* (2013.01); *F03D 3/005* (2013.01); *F03D 3/061* (2013.01); *F03D 3/062* (2013.01); *F05B 2240/214* (2013.01); *F05B 2240/232* (2013.01); *F05B 2240/301* (2013.01); *Y02E 10/721* (2013.01); *Y02E 10/74* (2013.01)

(58) Field of Classification Search
CPC ...... F03D 7/0232; F03D 7/0252; F03D 3/068; F03D 3/005; F03D 3/062; F03D 3/06; F03D 3/0641; F03D 3/061; F05B 2240/232
See application file for complete search history.

(56) References Cited

U.S. PATENT DOCUMENTS 3,038,543 A * 6/1962 Davidson .............. F03D 7/0252
416/132 R
2007/0189889 A1* 8/2007 Yokoi ..................... F03D 3/005
415/4.4

* cited by examiner

Primary Examiner — Richard A Edgar
Assistant Examiner — Maxime M Adjagbe
(74) Attorney, Agent, or Firm — Kyle R Satterthwait; Ryan W Dupuis; Ade & Company Inc.

(57) ABSTRACT

A unique wind turbine blade features a drag element having a concave surface for impingement of airflow thereagainst to create a drag force, and an airfoil having a rounded edge and an opposing sharper edge. The sharp edge points toward the drag element from a side thereof to which the concave surface faces, and the rounded edge points away from the drag element on the same side thereof as the sharp edge such that the sharp edge leads the rounded edge under movement of the drag element by the drag force. A unique wind turbine features an auxiliary support bearing disposed at a spaced axial distance from the rotor, and an auxiliary blade support connection spanning from the auxiliary bearing to the blade at a distance spaced axially from where a rotor blade support connects to said blade.

20 Claims, 7 Drawing Sheets

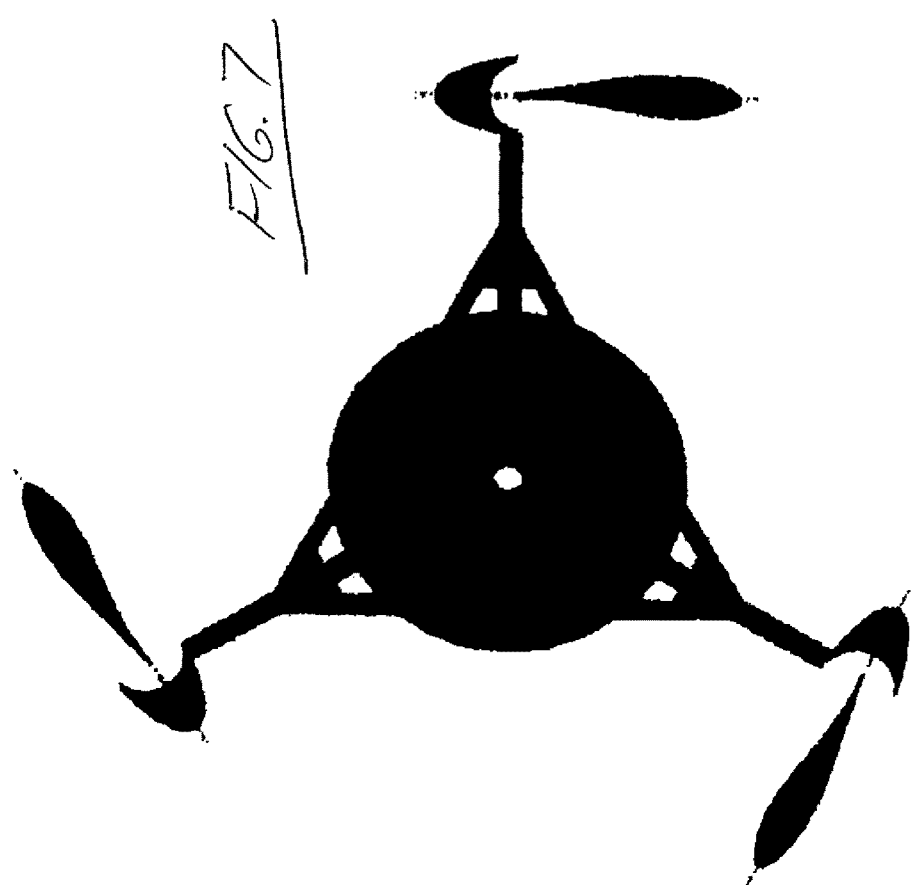

WIND TURBINE BLADE WITH
POCKET-SHAPED DRAG PORTION,
REVERSED-ORIENTATION AIRFOIL
TRAILING SAME, AND AUXILIARY BLADE
SUPPORTS

CROSS-REFERENCE TO RELATED
APPLICATIONS

This application is the national stage of PCT/CA2016/051036, filed Sep. 1, 2016, which claims benefit under 35 U.S.C. 119(e) of U.S. Provisional Patent Application No. 62/213,184, filed Sep. 2, 2015.

FIELD OF THE INVENTION

The present invention relates generally to wind turbines, and more particularly to a vertical axis wind turbine with a unique blade design featuring a drag-producing pocket-shaped element trailed by a reverse-orientation airfoil whose sharp edge points into the concave pocket of the drag element, and featuring auxiliary supports disposed above and below the rotor connection arms that couple the blades to the rotor of the turbine's generator for improved blade stability.

BACKGROUND OF THE INVENTION

It has been previously proposed in the prior art to produce a vertical axis wind turbine (VAWT) with a hybrid blade design exploiting both lift and drag forces for wind-driven revolution of the blades around the rotational axis of the turbine in order to drive the turbine's generator and produce electrical current from same.

Examples of such prior art blade's featuring a pocket-shaped drag element with a concave surface at a trailing side thereof and an airfoil-shaped lift element whose rounded leading edge faces into the concave pocket of the drag element's trailing end are found in PCT Application Publication No. WO2011/075833, German Patents DE3505489 and DE4120908, and French Patent Application No. FR2567588.

However, Applicant has invented a new wind turbine blade design with a unique configuration of pocket and airfoil elements and improved support for rotationally carrying blades of this or other types.

Other references concerning blade designs for wind turbines include Swiss Patent No. CH99832, PCT Application Publication No. WO2013016593, and U.S. Pat. Nos. 7,198,471 and 7,084,523.

SUMMARY OF THE INVENTION

According to a first aspect of the invention, there is provided a wind turbine blade comprising:

a drag element having a concave surface for impingement of airflow thereagainst to create a drag force;

an airfoil having a rounded edge and an opposing sharper edge, the sharp edge pointing toward the drag element from a side thereof to which the concave surface faces and the rounded edge pointing away from the drag element on the same side thereof as the sharp edge such that the sharp edge leads the rounded edge under movement of the drag element by the drag force.

Preferably the sharper edge points toward a location on the concave surface of the drag element that is offset to one side of an axis that bisects a curvature profile of the concave surface.

Preferably the airfoil is an asymmetric airfoil having a first surface that spans from the rounded edge to the sharper edge and has a curvature of greater camber than a second surface spanning from the rounded edge to the sharper edge, and wherein the second surface faces toward the same side of the axis as the location to which the sharper edge of the airfoil points.

Preferably a mean camber line of the airfoil, where said mean camber line intersects the sharper edge of the airfoil element, is angularly offset from a bisecting axis that bisects a curvature profile of the concave surface of the drag element.

Preferably a slope of the mean camber line at the sharper edge of the airfoil intersects the concave surface of the drag element on a same side of the bisecting axis as is faced by the second surface of the airfoil element.

Preferably a chord line of the airfoil is angularly offset from the bisecting axis.

Preferably the chord line intersects the concave surface of the drag element on a same side of the bisecting axis as is faced by the second surface of the airfoil element.

Preferably there is a rotor connection element reaching from a side of the blade to an end of the rotor connection element at which said rotor connection element is arranged for coupling to a rotor of a wind turbine, and at least one auxiliary support element reaching to the same side of the blade as the rotor connection element at a distance spaced therefrom in a length dimension of the blade for connection to an auxiliary support bearing of the wind turbine at an distance spaced from the rotor along a rotational axis thereof.

According to a second aspect of the invention, there is provided a wind turbine comprising:

a rotor supported for rotation about a rotational axis; and at least one blade coupled to the rotor to drive rotation thereof about the rotational axis under action of a wind current on said blade, wherein the at least one blade comprises:

a drag element having a concave surface for impingement of airflow thereagainst to create a drag force;

an airfoil having a rounded edge and an opposing sharper edge, the sharper edge pointing toward the drag element from a side thereof to which the concave surface faces and the rounded edge pointing away from the drag element on the same side thereof as the sharp edge such that the sharp edge leads the rounded edge under movement of the drag element by the drag force.

Preferably the sharper edge points toward a location on the concave surface of the drag element that is located radially nearer to the rotational axis of the rotor than a bisecting axis that bisects a curvature profile of the concave surface where said axis intersects the concave surface.

Preferably a mean camber line of the airfoil has a slope at an intersection point of said camber line with the sharper edge of the airfoil element, and said slope is angularly offset from the bisecting axis.

Preferably a chord line of the airfoil is angularly offset from the bisecting axis.

Preferably the airfoil is an asymmetric airfoil having a first surface that spans from the rounded edge to the trailing edge, faces away from the rotational axis of the rotor, and has a curvature of greater camber than a second surface that spans from the rounded edge to the sharper edge and faces toward the rotational axis of the rotor.

Preferably there is an auxiliary support bearing disposed concentrically on the rotational axis of the rotor at a spaced distance from said rotor along said rotational axis, a rotor blade support connection spanning from the rotor to the blade so as to carry the blade on the rotor, and a separate auxiliary blade support connection spanning from the auxiliary support bearing to the blade and connecting to the blade at a distance spaced from where the rotor blade support connection connects to said blade in a lengthwise dimension of the blade measured parallel to the rotational axis of the rotor.

According to a third aspect of the invention, there is provided a wind turbine comprising:

a rotor supported for rotation about a rotational axis; and at least one blade coupled to the rotor by a respective rotor blade support connection spanning from the rotor to the blade so as to carry the blade on the rotor and drive rotation of the rotor about the rotational axis under action of a wind current on said blade;

an auxiliary support bearing disposed concentrically on the rotational axis of the rotor at a spaced distance from said rotor along said rotational axis; an auxiliary blade support connection spanning from the auxiliary support bearing to the blade and connecting to the blade at a distance spaced from where the rotor blade support connection connects to said blade in a lengthwise dimension of the blade measured parallel to the rotational axis of the rotor.

Preferably the rotor is part of a generator assembly that also comprises a stator cooperable with the rotor to generate electricity under relative rotation between the rotor and the stator.

BRIEF DESCRIPTION OF THE DRAWINGS

In the accompanying drawings, which illustrate one or more exemplary embodiments of the present invention:

FIG. 7 is a schematic overhead plan view of a vertical axis wind turbine employing the blade structure of FIG. 6.

DETAILED DESCRIPTION

Figure 1:
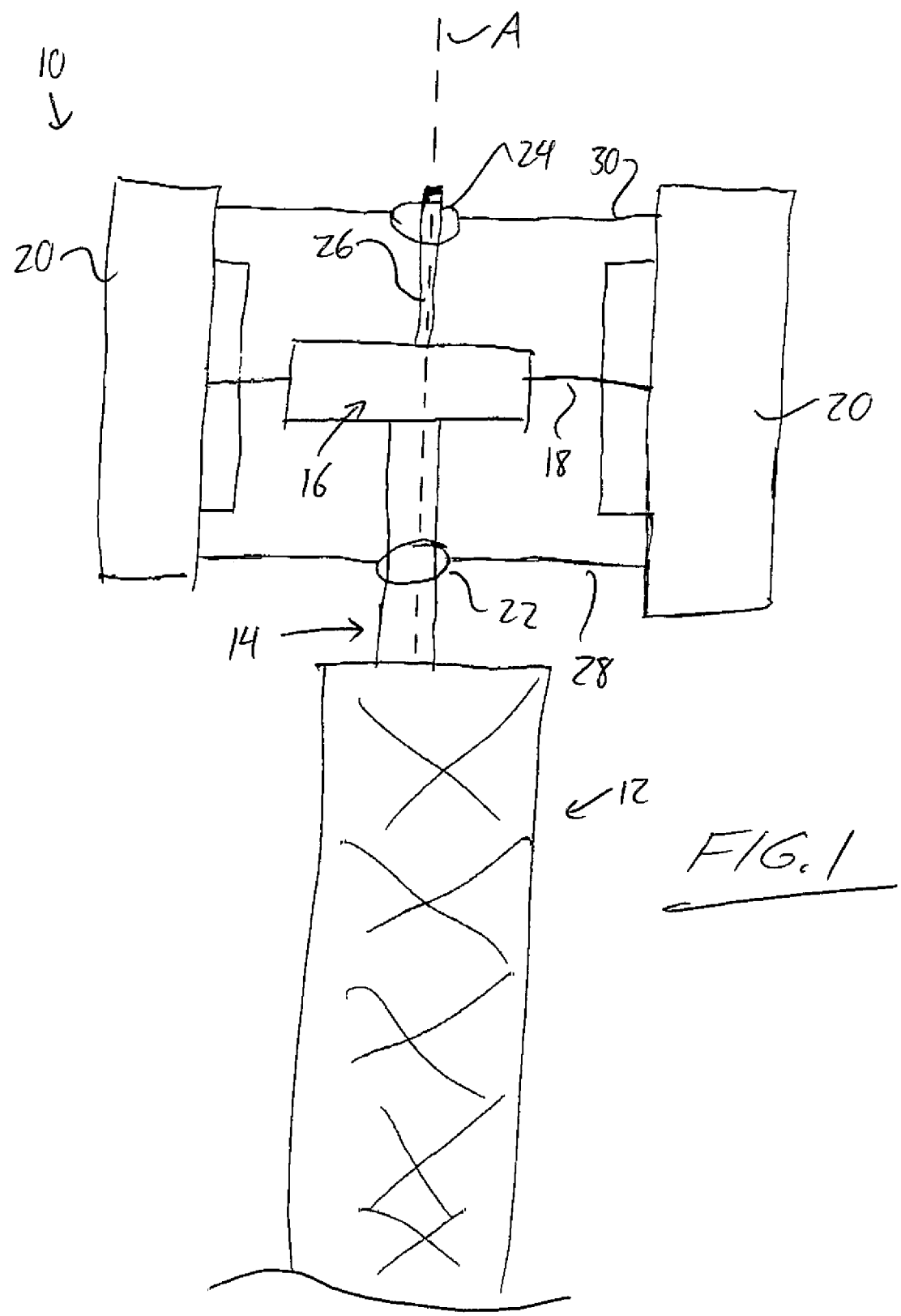
FIG. 1 is a schematic illustration of a vertical axis wind turbine of the present invention featuring additional auxiliary support for the turbine blades at locations both above and below the conventional connection of the blades to the rotor of the wind turbine's generator.

FIG. 1 schematically illustrates a vertical axis wind turbine 10 according to one embodiment of the present invention. In a conventional manner, the wind turbine 10 features a vertical tower or other upright support structure 12 to situate other components at an elevated position, an upright mount 14 upstanding from the support structure 12 to carry a generator 16 a short distance above the support structure, a set of blade support arms 18 extending radially outward from a rotor of the generator 16, and a respective set of wind turbine blades 20 carried respectively on the support arms 18.

As is known in the art, the rotor carries a plurality of permanent magnets thereon in circumferentially disposed positions around the rotor in close proximity to a plurality of wire coils likewise positioned circumferentially around the stator. The rotor is supported for rotation about a central vertical axis A which aligns with a matching central axis the stator, and the stator-facing poles of the magnets alternate between North and South from one magnet to the next moving around the axis A. The stator-facing poles of the magnets are in close proximity to the stator coils along the axis A, thereby forming an axial flux generator in which current is induced in the coils by movement of the magnets therepast during rotation of the rotor under the effect of wind currents acting on the turbine blades.

The wind turbine of FIG. 1 differs from conventional vertical axis turbines in the addition of auxiliary support bearings 22 and 24 spaced vertically above and below the generator 16. The lower auxiliary bearing 22 below the generator is mounted on the tower-to-generator mount 14 in a concentric position aligned on the same rotational axis A as the rotor of the generator 16. The upper auxiliary bearing 24 is mounted on an extra upright shaft 26 that projects vertically from atop the generator, for example from the top end of a vertical spindle of the generator on which the rotor is carried by bearing. Alternatively, the spindle of the generator may be increased in length to project upward from a remainder of the generator in order to carry the upper auxiliary bearing 24 directly on the same spindle as the rotor. The upper auxiliary bearing 24 is concentrically disposed in relation to the lower bearing and rotor so as to share the same axis of rotation A.

A set of lower support arms 28 are each coupled to the outer race of the lower auxiliary bearing 22 at one end, and respectively attached to the turbine blades 20 at the other end. Likewise, a set of upper support arms 30 are each coupled to the outer face of the upper auxiliary bearing 24 at one end, and respectively attached to the turbine blades 20 at the other end. The upper and lower sets of arms thus augment the conventional support provided by the rotor-to-blade connection arms 18 in order to provide improved stability to the blades by better maintaining a predetermined radial distance of each blade from the rotational axis A at or near the top and bottom ends of each blade's vertically elongated shape.

It will be appreciated that the term 'arm' is not intended to denote a member of any particular shape or form, and so the connection between the rotor and blades and the auxiliary supports between the auxiliary bearings and blades may take any of a number of different possible forms while providing the described extra stability to the blades. In addition, such an arrangement may be used regardless of whether all the blades are connected to a same common rotor, or to different rotors of a multi-rotor generator assembly. Similarly, different blades may attach to different auxiliary bearings, although multiple blades are preferably attached to each auxiliary bearing in order to reduce the total number of bearings required.

Figure 2:
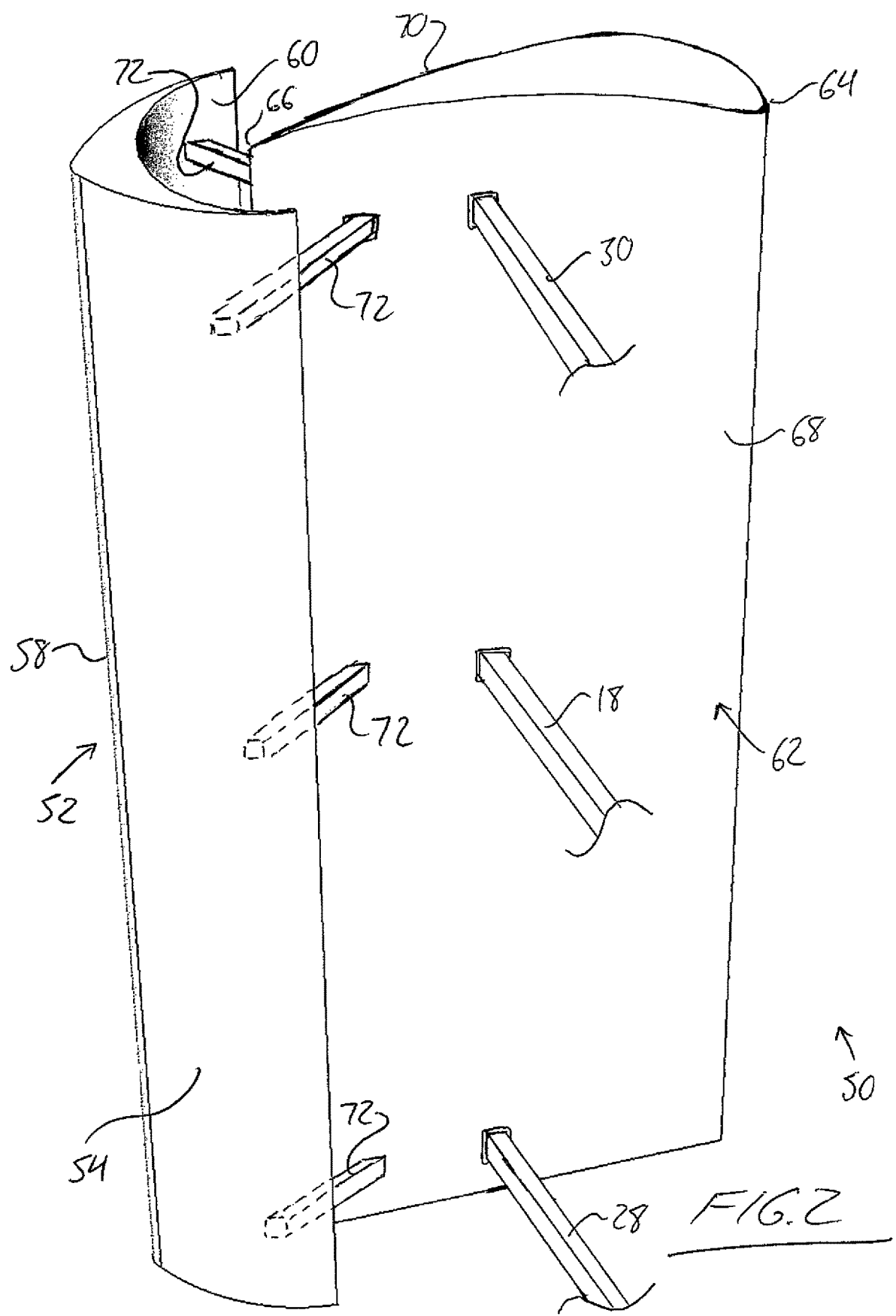
FIG. 2 is a perspective view of a wind turbine blade of the present invention featuring a pocket-shaped drag element in a leading position and a reversed airfoil in a trailing position with the sharp edge of the airfoil pointing into the concave pocket of the drag element.
Figure 3:
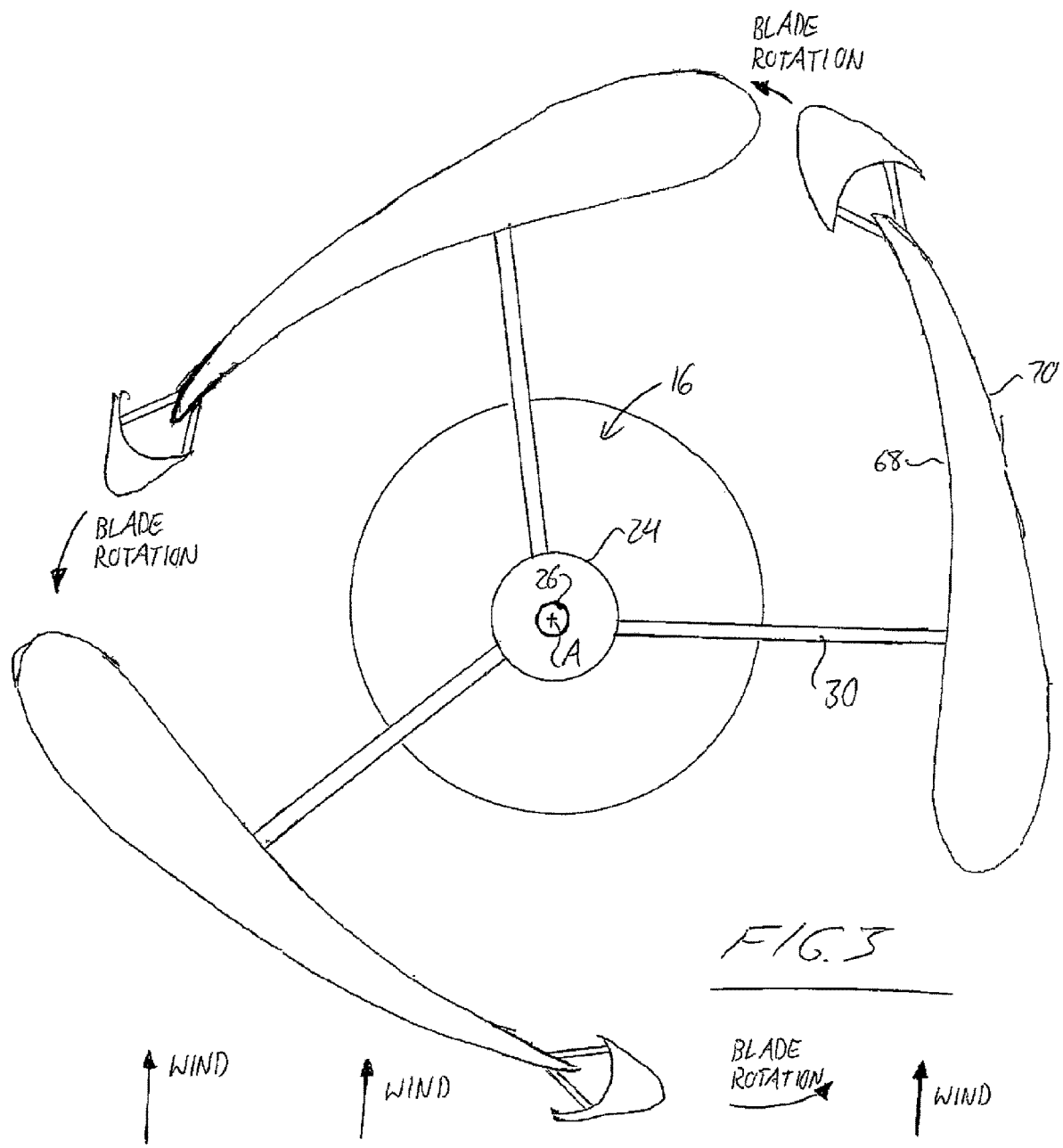
FIG. 3 is a schematic overhead plan view of a vertical axis wind turbine employing the auxiliary supports of FIG. 1 and the pocket and airfoil blade design of FIG. 2.

Turning now to FIG. 2, a unique wind turbine blade 50 of the present invention is shown. The blade 50 features a vertically elongated trough-like drag element 52 of uniform cross-sectional throughout its length dimension, which is vertically oriented parallel to the rotational axis A of a vertical axis wind turbine when in use on same. The drag element's cross-section has a pocket-like or cup-like shape featuring a generally parabolic or elliptically contoured outer surface 54 whose point or apex 56 defines a leading tip of the blade's horizontal cross-section, thus corresponding to a narrow, vertically oriented leading edge 58 of the blade spanning the full height thereof. The inside of the drag element's pocket shape is defined by an arcuate or other concavely contoured inner surface 60 that is centered symmetrically on a bisecting axis B that bisects the parabolic outer surface 54 through the apex 56 thereof. This surface 60 thus recesses into the backside of the drag element's cross-section 52 to form a concavely contoured pocket.

When the blade is at a position around the turbine's rotational axis such that the pocket faces into the oncoming wind, the wind current or air flow will impinge against the concave backside surface 60 of the drag element 52, thus creating a drag force pushing the blade in the direction in which the drag element's leading tip is pointing, thus acting to move the blade around the rotational axis in this direction. A drag element of similar shape is shown in FIG. 4B of aforementioned German reference DE3505489, the entirety of which is incorporated by reference. The drag element may depart somewhat from such shape while still providing a concave surface for the wind to impinge on to create the drag force, and may for example have a more purely arcuate form in which the outer surface is arcuately concentric with the inner surface, such as shown in FIG. 2 of the same reference. Such a drag element may be formed, for example, by bending of a flat plate into such an arcuate form. However, as the parabolic or elliptical exterior surface tapers off more quickly from its apex than an arc of same span across the bisecting axis B would, the illustrated pocket shape may reduce air resistance to the movement of the drag element around the rotational axis of the turbine.

The blade 50 also features an airfoil element 62 of vertically elongated shape whose length defines the vertical height of this element of the blade, which may equal that of the drag element 52. The airfoil element has an asymmetric airfoil shape in its horizontal cross-section, which is uniform through the blade height in the illustrated embodiment. However, unlike the hybrid drag and airfoil combination blades of the prior art, the orientation of the airfoil is reversed from a conventional configuration in which the more rounded end 64 of the airfoil shape leads the sharper end 66 of the airfoil shape. Instead, the sharper end 66 of the airfoil profile leads the rounded end 64 in the blade's wind-driven direction of motion, and so it is this sharper end 66 that points into the concave rear pocket 60 of the drag element 52.

Figure 4:
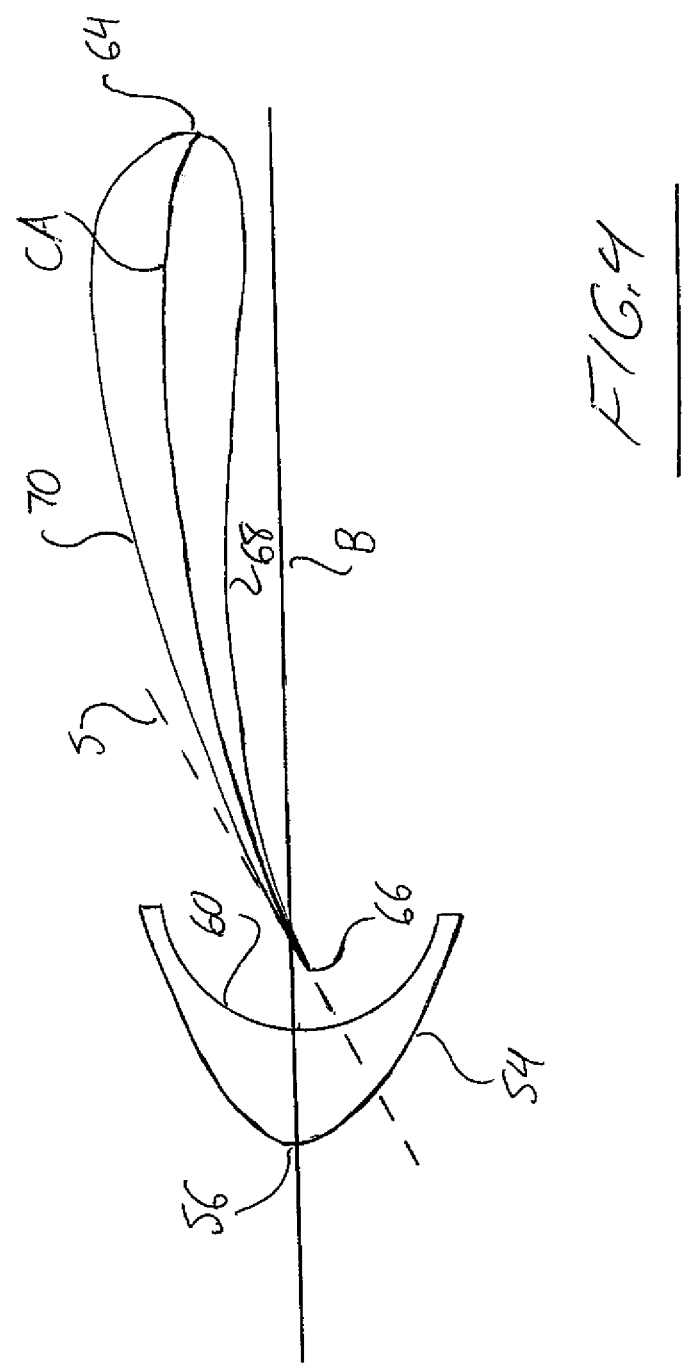
FIG. 4 is a schematic cross-sectional view of a wind turbine blade of the type shown in FIG. 2.
Figure 5:
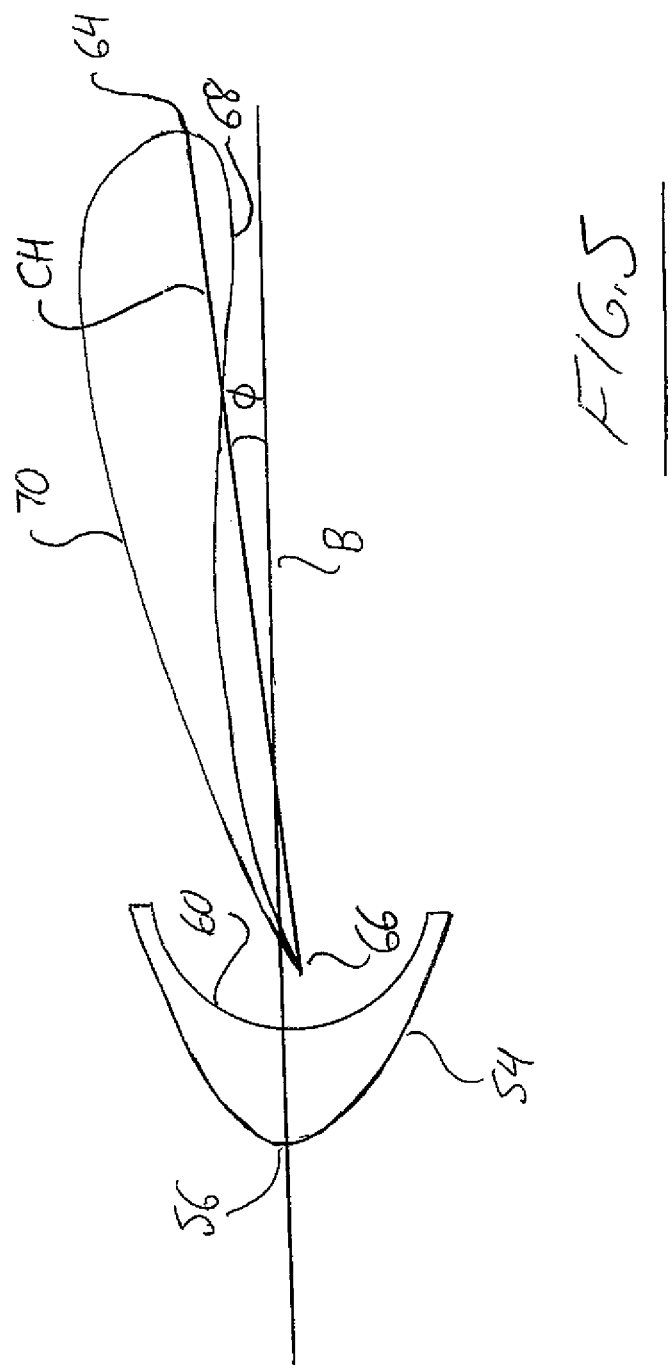
FIG. 5 is a schematic cross-sectional view of another wind turbine blade of the type shown in FIG. 2.

Further detail of the geometric relationship between the airfoil 62 and drag pocket 52 in possible embodiments of the present invention is now described in reference to schematic illustrations of FIGS. 4 and 5, which are not to scale, as certain geometric relationships have been exaggerated for improved recognition and understanding of same.

The airfoil 62 of FIG. 4 is in a tilted in relation to the drag pocket 52, whereby the slope (represented by broken line S) of the mean camber line CA of the airfoil at the sharper end thereof is obliquely angled relative to the bisecting line B of the drag pocket 60 so that, in the direction continuing forwardly from the sharper end of the airfoil toward the concave pocket surface 60, the slope line S intersects the concave pocket surface 60 on the side of the bisecting line B that is radially nearer to the rotational axis of the wind turbine. The leading sharp edge of the airfoil is thus offset angularly from the center of the pocket so as to point radially inwardly at a slight angle relative to the pocket (the term 'radial' in this context being in reference to the rotational axis of the wind turbine). The angle between the slope line S and bisecting line B is between 1 and 5 degrees in some embodiments, and particularly five degrees in one embodiment, but may vary in either direction from such measurement.

Turning to FIG. 5, the chord line CH of the airfoil 62 of the blade configuration illustrated in this figure is sloped relative to the bisecting line B of the drag pocket in horizontal cross-sectional planes of the blade. The direction of slope is such that the axis defined by the chord line CH is sloped radially inward (in terms of radial distance to the vertical axis of the wind turbine) relative to the bisecting line B in the back to front direction of the blade (i.e. moving from the trailing rounded edge 64 of the airfoil to the leading sharper edge 66 of the airfoil). The sharper leading edge 64 thus again points 'inwardly' relative to the pocket. The angle φ between the chord line CH and bisecting line B may be between 1 and 5 degrees in some embodiments, and particularly five degrees in one embodiment, but may vary in either direction from such measurement.

The asymmetric airfoil is oriented so that of the two opposing cambered surfaces 68, 70 that each span from the sharp edge 66 of the airfoil to the opposing rounded edge 64 thereof, the surface 68 of lesser camber faces toward the rotational axis of the wind turbine, and the surface 70 of greater camber faces outwardly away from the rotational axis of the wind turbine. That is, the surface of the airfoil that would generally be considered the 'top wing surface' when used in an aircraft wing profile forms the outer surface of the turbine blade's airfoil that faces radially outward of the turbine's rotational axis, and the opposing 'bottom wing surface' of the airfoil forms the inner surface of the turbine blade airfoil that faces inwardly toward the turbine's rotational axis.

FIG. 2 shows the wind turbine blade 50 being carried by the lower support arm 28 which connects to the lower auxiliary support bearing 22 of the wind turbine, the upper support arm 30 which connects to the upper auxiliary support bearing 22 of the wind turbine, and the intermediate support arm 18 which connects to the rotor of the wind turbine's generator 16. In the embodiment of this figure, each of these support arm connections to the blade is made by direct attachment thereof to the airfoil 62, for example by passage or attachment through a skin of the airfoil at the lower-camber surface 68 that faces toward the wind turbine's rotational axis A and attaching to connect to one or more reinforcement or frame members disposed within a hollow interior of the airfoil. The airfoil interior is enveloped by the airfoil skin that defines the cambered surfaces 68, 70 that join together at the sharp and rounded ends 64, 66 of the airfoil.

The support arms may pass through the skin into the interior space, where they are fastened to the internal framework or reinforcement of the airfoil, or may be fastened to the internal component(s) through the skin. Alternatively, the airfoil skin may be sufficiently strong for attachment of the support arms thereto without attachment to internal components. Although not shown, two or more of the blade support arms may be connected together by bracing disposed intermediately in the radial distance separating the generator from the blades.

In illustrated embodiments, the drag pocket 52 and the airfoil 62 are fixed together by struts 72 that each have one end attached to the airfoil element 62 and the other end attached to the drag element 52. In the illustrated configuration, there are two sets of struts, one on each side of the airfoil so that each strut projects laterally and forwardly from the airfoil at an oblique angle relative to the respective cambered surface 60, 70 from which it projects. Each strut reaches into the pocket of the drag element 52, where the other end of the strut is attached to the drag element 52 at or through the concave surface 60 thereof. One set of struts attaches to the drag element 52 on one side of the bisecting line B thereof, and the other set of struts attach to the drag element 52 on the other side of the bisecting line B. The struts thus carry the drag element 52 on the airfoil 62 in a position leading the vertically oriented sharp edge 66 thereof, and the airfoil is in turn carried on the generator rotor of the wind turbine by the support arms 18, 28, 30.

The struts of the illustrated configuration are spaced apart along the length/height dimension of the airfoil 62, which in the illustrated embodiment is equal to that of the drag pocket 52, and are arranged in aligned pairs on the two sides of the airfoil. Each strut thus has a matching strut of equal elevation on the other side of the airfoil, and this pair of struts forms a V-shaped horizontal connection diverging forwardly from the airfoil to the drag pocket.

In other embodiments, the drag element and airfoil element need not necessarily be directly attached to one another so as to share a common connection to the rotor and any auxiliary support bearings that may be used. For example, the drag element could be connected to the rotor, and/or the auxiliary support bearings, by one or more support arms that are separate and distinct from those of the airfoil. Such drag element support arms would set the drag element in a predetermined position relative to the respective airfoil, whereby the separately supported drag element and airfoil still collectively form an overall blade structure of the same type described above and shown in the drawings.

Figure 6:
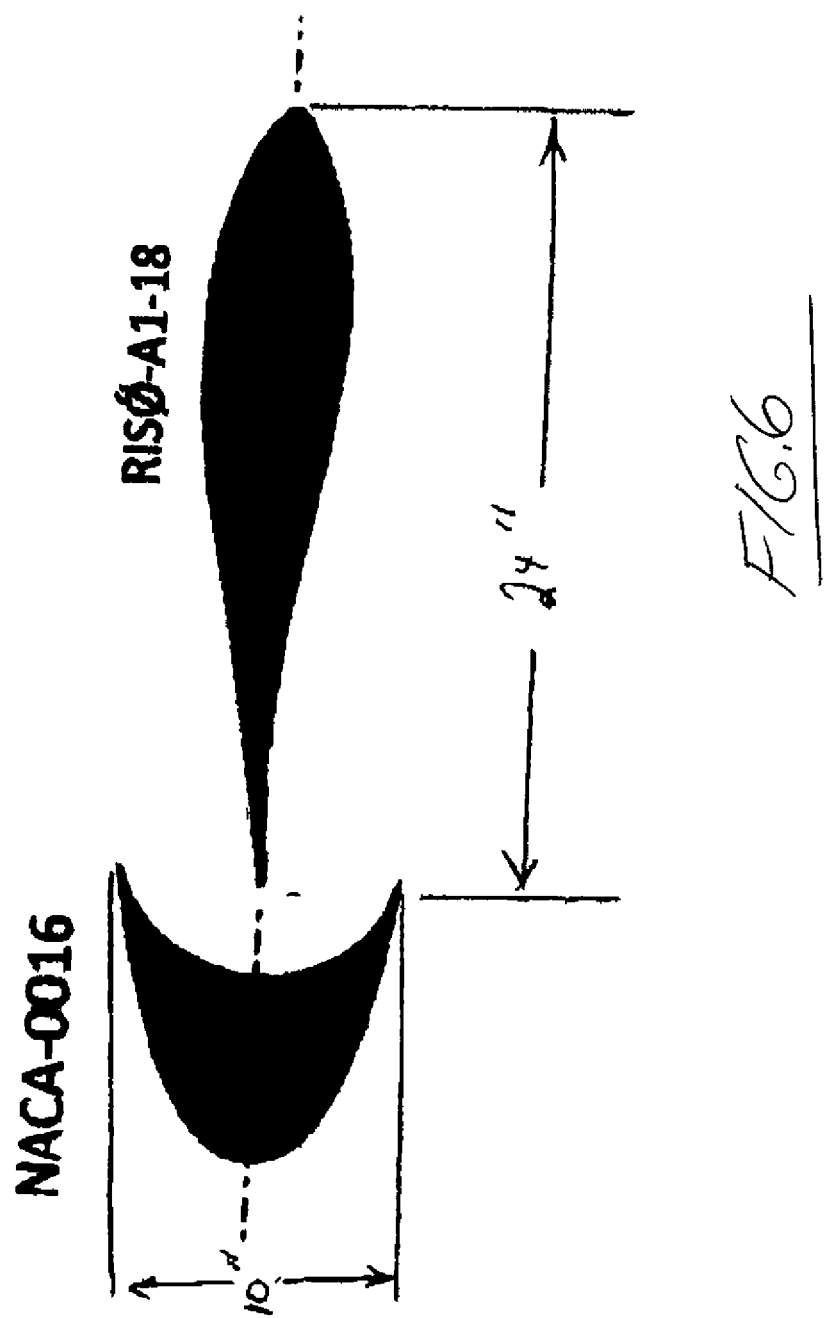
FIG. 6 is a schematic cross-sectional view of another wind turbine blade of type of the same general configuration of FIG. 2, but employing particularly selected airfoil profiles of known types at both the pocket-shaped drag element and the reversed airfoil.

FIG. 6 illustrates one preferred combination of pocket and airfoil shape for a blade of the present invention, for example for use in a three-blade vertical axis turbine schematically shown in FIG. 7. CFD (computational fluid dynamics) testing has found beneficial results from the use of this combination with a relative angling of the airfoil relative to the pocket. This configuration uses a Risø-A1-18 airfoil, and a truncated rounded end of a NACA-0016 airfoil with a concave cutaway in the rear side of this shape to define an air pocket similar to those described above in relation to the other embodiments. The pocket-defining truncated NACA-0016 thus may be considered a 'leading foil', and the intact Risø-A1-18 airfoil considered a 'trailing foil'.

The rounded NACA-0016 leading edge of the overall blade results in reduced drag when the blade rotation opposes the wind direction, and the trailing edge foil increases lift. The Risø-A1-18 trailing edge foil results in reduced drag and results in a stall at higher angles of attack resulting in less turbulence and reduced rotor drag. The lower camber rotor-facing side of the Risø-A1-18 airfoil features a concave region adjacent the sharper leading edge thereof before transitioning into a convex curvature moving onward toward the trailing rounded edge of the airfoil.

While FIG. 6 indicates a width dimension of approximately 10-inches measured from tip to tip across the concave trailing side of the leading pocket element and a length dimension of approximately 24-inches measured from such tips of the pocket to the trailing rounded edge of the trailing airfoil, it will be appreciated that these are examples only, and may vary within the scope of the present invention. Likewise, a diameter measurement of 93 inches and circumferential measurement of 292 inches of the circular path of the blades around the rotational axis of the turbine, as indicated in FIG. 7, are presented as examples only, and do not limit the scope of the present invention.

Since various modifications can be made in my invention as herein above described, and many apparently widely different embodiments of same made within the scope of the claims without departre from such scope, it is intended that all matter contained in the accompanying specification shall be interpreted as illustrative only and not in a limiting sense.

The invention claimed is:

1. A wind turbine blade for a vertical axis wind turbine, said blade comprising:
   a drag element having a first elongated shape of greater measure in an elongation direction thereof than in cross-sectional planes lying normal to said elongation direction, and having, in said cross-sectional planes, a first cross-sectional shape defining a concave pocket positioned and oriented to receive impingement of wind current thereagainst to drive revolution of the blade about a rotation axis parallel to said elongation direction; and
   an airfoil having a second elongated shape of greater measure in the elongation direction than in the cross-sectional planes lying normal to said elongation direction, and having, in said cross-sectional planes, a second cross-sectional shape having a rounded edge and an opposing sharper edge, the sharper edge pointing toward the drag element from a side thereof to which the concave pocket faces and the rounded edge pointing away from the drag element on the same side thereof as the sharper edge such that the sharper edge leads the rounded edge under revolution of the blade around the rotation axis by said impingement of wind current against the concave pocket of the drag element.

2. The blade of claim 1 wherein, in each cross-sectional plane, the sharper edge points toward a surface location in the concave pocket of the drag element that is offset to one side of an axis that bisects a curvature profile of the concave pocket.

3. The blade of claim 2 wherein the airfoil is an asymmetric airfoil having a first surface that spans from the rounded edge to the sharper edge and has a curvature of greater camber than a second surface spanning from the rounded edge to the sharper edge, and wherein the second surface faces toward the same side of the axis as the surface location to which the sharper edge of the airfoil is pointing.

4. The blade of claim 1 wherein a mean camber line of the airfoil, at a location where said mean camber line intersects the sharper edge of the airfoil, is angularly offset from an axis that bisects a curvature profile of the concave pocket of the drag element.

5. The blade of claim 4 wherein the airfoil is an asymmetric airfoil having a first surface that spans from the rounded edge to the sharper edge and has a curvature of greater camber than a second surface spanning from the rounded edge to the sharper edge, and a slope of the mean camber line at the sharper edge of the airfoil intersects the concave surface of the drag element on a same side of a bisection axis that bisects a curvature profile of the concave pocket of the drag element as is faced by the second surface of the airfoil.

6. The blade of claim 1 wherein a chord line of the airfoil is angularly offset from a bisection axis that bisects a curvature profile of the concave pocket of the drag element.

7. The blade of claim 6 wherein the airfoil is an asymmetric airfoil wherein a first surface spanning from the rounded edge to the sharper edge has a curvature of greater camber than a second surface spanning from the rounded edge to the sharper edge, and the chord line intersects the concave surface of the drag element on a same side of a bisection axis that bisects a curvature profile of the concave surface of the drag element as is faced by the second surface of the airfoil.

8. The wind turbine blade of claim 1 wherein, in the elongation direction, the drag element and the airfoil each span at least a substantially full length of one another.

9. The wind turbine blade of claim 1 wherein, in the elongation direction, the drag element and the airfoil are of equal length to one another.

10. A method of using the wind turbine blade of claim 1 comprising using said impingement wind current against the concave pocket of the drag element to drive revolution of said blade around said rotation axis in a revolution direction in which the sharper edge of the airfoil leads the rounded edge thereof.

11. A vertical axis wind turbine comprising:
a rotor supported for rotation about a vertical rotation axis; and
a blade coupled to the rotor to drive rotation thereof about the vertical rotation axis under action of a wind current on said blade, wherein the at least one blade comprises:
a drag element having, in horizontal cross-sectional planes of normal orientation to said vertical rotation axis, a first cross-sectional shape defining a concave pocket positioned and orientated relative to said vertical rotation axis to receive impingement of said wind current against said concave pocket to thereby drive revolution of the blade around said vertical rotation axis;
an airfoil having, in said cross-sectional planes, a second cross-sectional shape having a rounded edge and an opposing sharper edge, the sharper edge pointing toward the drag element from a side thereof to which the concave pocket faces and the rounded edge pointing away from the drag element on the same side thereof as the sharper edge such that the sharper edge leads the rounded edge under revolution of the blade around the vertical rotation axis under impingement of said wind current against the concave pocket of the drag element.

12. The vertical axis wind turbine of claim 11 wherein the sharper edge points toward a surface location in the concave pocket of the drag element that is located radially nearer to the vertical rotation axis of the rotor than a bisection point at which a curvature profile of the concave pocket is bisected by a bisection axis.

13. The vertical axis wind turbine of claim 11 wherein a mean camber line of the airfoil has a slope at an intersection point of said camber line with the sharper edge of the airfoil, and said slope is angularly offset from a bisection axis that bisects a curvature profile of the concave pocket of the drag element.

14. The vertical axis wind turbine of claim 11 wherein a chord line of the airfoil is angularly offset from a bisection axis that bisects a curvature profile of the concave surface of the drag element.

15. The vertical axis wind turbine of claim 11 wherein the airfoil is an asymmetric airfoil having a first surface that spans from the rounded edge to the trailing edge, faces away from the vertical rotation axis of the rotor, and has a curvature of greater camber than a second surface that spans from the rounded edge to the sharper edge and faces toward the vertical rotation axis of the rotor.

16. The vertical axis wind turbine of claim 11 wherein both the drag element and the airfoil are of vertically elongated shape, and the drag element and the airfoil each span a substantially full vertical length of one another.

17. The vertical axis wind turbine of claim 11 wherein both the drag element and the airfoil are of vertically elongated shape, and the drag element and the airfoil are of vertically equal length to one another.

18. A method of using the vertical axis wind turbine of claim 11 comprising using impingement of said wind current against the concave pocket of the drag element to drive revolution of said blade around said vertical rotational axis in a revolution direction in which the sharper edge of the airfoil leads the rounded edge thereof.

19. A wind turbine blade for a vertical axis wind turbine, said blade comprising:
a drag element having, in cross-sectional planes of the blade, a first cross-sectional shape defining a concave pocket;
an airfoil having, in said cross-sectional planes of the blade, a second cross-sectional shape having a rounded edge and an opposing sharper edge, the sharper edge pointing toward the drag element from a side thereof to which the concave pocket faces and the rounded edge pointing away from the drag element on the same side thereof as the sharper edge; and
a rotor connection element that extends from a side of the blade and has an end situated furthest from the blade at which the rotor connection element is arranged for coupling to a rotor of the vertical axis wind turbine;
wherein the concave pocket of the drag element is positioned and oriented relative to the connection element so as to be impinged by wind current to drive revolution of the blade about a rotation axis of the rotor of the wind turbine when the blade is in an installed position with the rotor connection element coupled to said rotor.

20. A method of using the wind turbine blade of claim 19 comprising using said impingement wind current against the concave pocket of the drag element to drive revolution of said blade around said rotation axis in a revolution direction in which the sharper edge of the airfoil leads the rounded edge thereof.

* * * * *